(12) United States Patent
Lee et al.

(10) Patent No.: US 9,058,603 B1
(45) Date of Patent: Jun. 16, 2015

(54) CLIENT-SIDE ENCRYPTION OF FORM DATA

(75) Inventors: Asheley S. Lee, Henderson, NV (US); Saffet G. Ozdemir, Las Vegas, NV (US); Christopher A. Weiss, Las Vegas, NV (US); Mark G. Madej, Las Vegas, NV (US); David B. Bailey, Truckee, CA (US)

(73) Assignee: Zappos IP, Inc., Henderson, NV (US)

( * ) Notice: Subject to any disclaimer, the term of this patent is extended or adjusted under 35 U.S.C. 154(b) by 433 days.

(21) Appl. No.: 12/984,264

(22) Filed: Jan. 4, 2011

(51) Int. Cl.
   *G06Q 20/00* (2012.01)
   *G06Q 20/38* (2012.01)
(52) U.S. Cl.
   CPC .................. *G06Q 20/3829* (2013.01)
(58) Field of Classification Search
   CPC ................................. G06Q 20/3829
   USPC ........................................... 705/71
   See application file for complete search history.

(56) References Cited

U.S. PATENT DOCUMENTS

| | | | |
|---|---|---|---|
| 7,178,021 B1 * | 2/2007 | Hanna et al. | 713/155 |
| 7,861,077 B1 * | 12/2010 | Gallagher, III | 713/155 |
| 2010/0036813 A1 * | 2/2010 | Cameron et al. | 707/3 |

FOREIGN PATENT DOCUMENTS

JP    2005301933 A * 10/2005 ............. G06F 17/60

* cited by examiner

*Primary Examiner* — James A Reagan
(74) *Attorney, Agent, or Firm* — Thomas | Horstemeyer, LLP

(57) ABSTRACT

Disclosed are various embodiments that facilitate client-side encryption of form data. A network page that includes client-side code that encrypts one or more data items using a public key is sent to the client. The data items are provided by a user in one or more form fields of the network page. The data items and one or more unencrypted data items are obtained from the client over an encrypted channel. The data items are encrypted using the public key when the data items have not been encrypted by the client-side encryption code. The data items are sent in an encrypted state to a server over an internal network. A firewall is interposed between the internal network and the server to protect the server from the internal network.

20 Claims, 7 Drawing Sheets

CLIENT-SIDE ENCRYPTION OF FORM DATA

BACKGROUND

Many network sites, such as those of online merchants, accept payment online. Common forms of online payment include, for example, credit cards, electronic checks, stored value cards, and so on. Safeguarding payment data is of paramount importance to network sites that accept payment online. The consequences surrounding a compromise of payment data could be disastrous for a network site. To this end, the Payment Card Industry Data Security Standard (PCI DSS) has been established as a worldwide information security standard. PCI DSS imposes minimum levels of security on network sites to limit access to payment data.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to client-side encryption of form data. When users enter their payment information into a form on a network page, the form data is typically sent to a network page server over an encrypted connection. Thereafter, the form data is often sent unencrypted over an internal network to a payment processing system. Unfortunately, the internal network is still subjected to numerous potential security hazards. For example, disgruntled employees may pose an internal threat, malicious programs may be inadvertently installed, external-facing systems may be compromised, "man-in-the-middle" attacks may be performed, and still other security hazards may exist.

Various embodiments of the present disclosure employ an end-to-end encryption scheme where sensitive form data is encrypted by public-key encryption code executed in the client. The form data remains in an encrypted state when processed by external-facing servers and transmitted via the internal network. Only when the form data is received on a secured portion of an internal network is the form data decrypted by a private key. In the following discussion, a general description of the system and its components is provided, followed by a discussion of the operation of the same.

Figure 1:
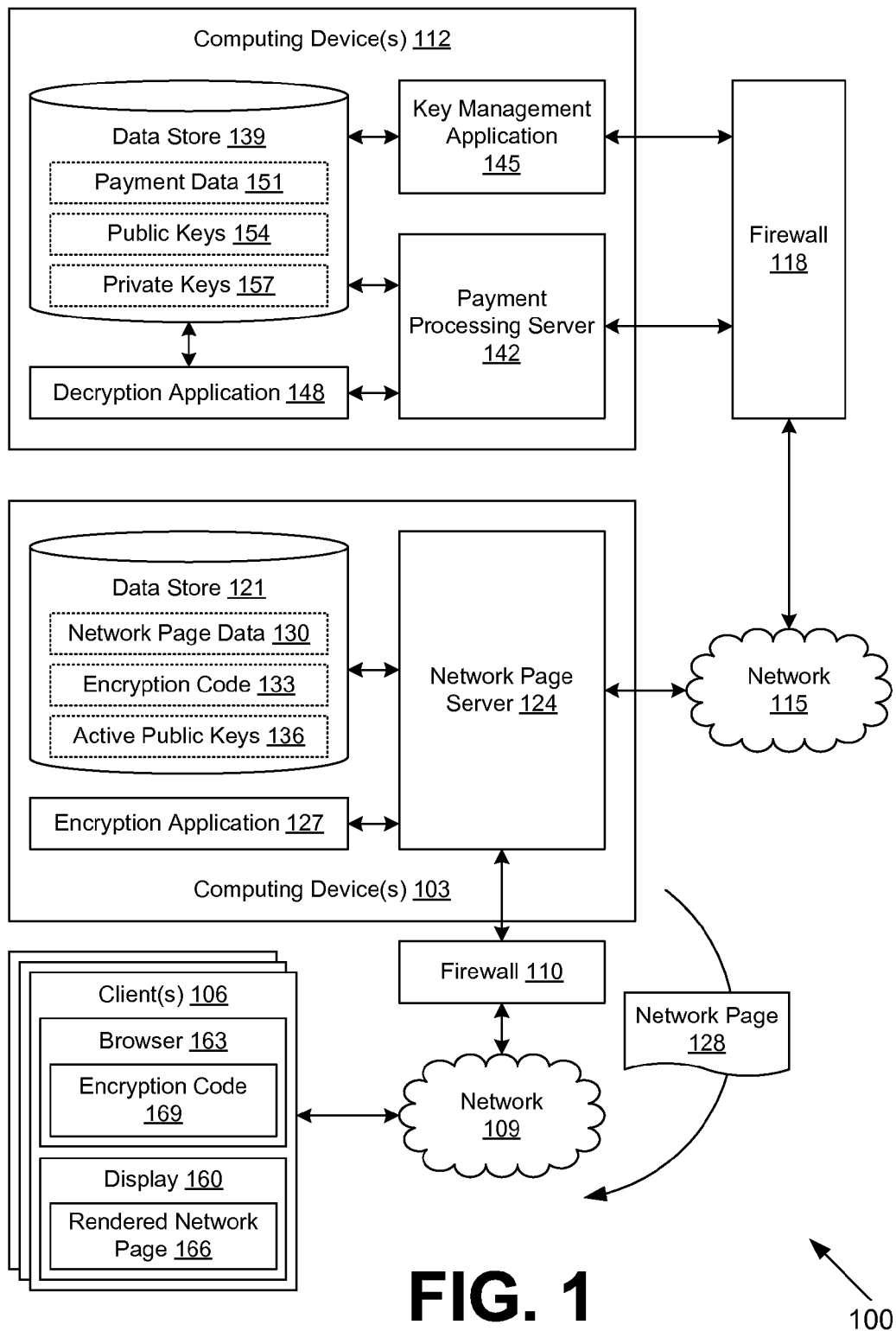
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks. The computing devices 103 may be behind a firewall 110 relative to the network 109, thereby protecting the computing devices 103 against at least some types of security threats originating in public portions of the network 109.

The networked environment 100 also includes one or more computing devices 112 in data communication with the computing devices 103 by way of a network 115 that corresponds to an internal network. The network 115 includes, for example, intranets, wide area networks (WANs), local area networks (LANs), wired networks, wireless networks, or other suitable networks, etc., or any combination of two or more such networks. Further, the computing devices 112 are behind a firewall 118 relative to the network 115. The firewall 118 may have a more restrictive configuration compared to the network 115.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 121 that is accessible to the computing device 103. The data store 121 may be representative of a plurality of data stores 121 as can be appreciated. The data stored in the data store 121, for example, is associated with the operation of the various applications and/or functional entities described below.

The components executed on the computing device 103, for example, include a network page server 124, an encryption application 127, and other applications, services, processes, systems, engines, or functionality not discussed in detail herein. The network page server 124 is executed to serve up network pages 128 associated with a network site that accepts secure form data, such as, for example, payment instrument information and/or other information. A payment instrument may correspond, for example, to a credit card, an electronic check, a stored value card, a line of credit, and/or other forms of payment. The network site may correspond, for example, to an online retailer, electronic marketplace, governmental entity, utility, bank, payment processor, and/or any other entity that accepts secure form data, such as for online payments. Although the examples discussed herein generally relate to payment processing, it is understood that the principles of the present disclosure may be applied to any form of secured data, which could include personally identifiable information, medical records information, academic records information, and/or other confidential information.

The network page server 124 is configured to send code to the client 106 along with the network page 128 to facilitate client-side encryption of form data. The network page server 124 is further configured to obtain form data, which may be encrypted and/or unencrypted from the client 106. The network page server 124 may comprise a commercially available hypertext transfer protocol (HTTP) server such as, for example, Apache® HTTP Server, Apache® Tomcat®, Microsoft® Internet Information Services (IIS), and/or other servers. The network page server 124 may also support HTTP secure (HTTPS) with transport layer security (TLS), secure sockets layer (SSL), and/or other approaches to create encrypted channels of communication over the networks 109 and 115. For purposes of discussion, it is understood that the network page server 124 may correspond to multiple layers of applications in the computing device 103 such as, for example, an application layer, a web service layer, and/or other layers. Such layers may involve multiple applications executing across multiple computing devices 103.

The encryption application 127 is executed by the network page server 124 to provide public-key encryption of data. The encryption application 127 may employ various cryptographic algorithms such as, for example, public-key cryptography, symmetric-key cryptography, hashing, etc. The encryption application 127 may correspond to a commercially available application, library, or module such as, for example, GNU Privacy Guard (GnuPG), Pretty Good Privacy (PGP®), and so on.

The data stored in the data store 121 includes, for example, network page data 130, encryption code 133, active public keys 136, and potentially other data. The network page data 130 includes any data used in generating network pages 128 including, for example, hypertext markup language (HTML) code, extensible markup language (XML) code, extensible stylesheet language transformations (XSLT) code, cascading stylesheets (CSS), dynamic HTML (DHTML), JavaScript®, other types of code, text, graphics, images, audio, video, animations, and/or other data.

The encryption code 133 corresponds to code that is sent to clients 106 in conjunction with a network page 128 to facilitate the client-side encrypting of form fields in the network page 128. The encryption code 133 may implement public-key encryption according to a specified public key obtained from the network page server 124 and/or another source. The encryption code 133 may employ various cryptographic algorithms such as, for example, public-key cryptography, symmetric-key cryptography, hashing, etc. The encryption code 133 may correspond to a commercially available application, library, or module such as, for example, GNU Privacy Guard (GnuPG), Pretty Good Privacy (PGP®), and so on. It is understood that the encryption code 133 is executable in a browser 163 and may comprise JavaScript®, Java®, and/or other code.

The active public keys 136 correspond to public keys that may be used by the encryption application 127 and/or the encryption code 133 to encrypt form data. The actual public key that is used in a given case may be selected at random, or according to established criteria, by the network page server 124. It is understood that the active public keys 136 may be associated with expiration dates and may be retired and replaced with another set of active public keys 136 periodically.

The computing device 112 may comprise, for example, a server computer or any other system providing computing capability. Alternatively, a plurality of computing devices 112 may be employed that are arranged, for example, in one or more server banks or computer banks or other arrangements. For example, a plurality of computing devices 112 together may comprise a cloud computing resource, a grid computing resource, and/or any other distributed computing arrangement. Such computing devices 112 may be located in a single installation or may be distributed among many different geographical locations. For purposes of convenience, the computing device 112 is referred to herein in the singular. Even though the computing device 112 is referred to in the singular, it is understood that a plurality of computing devices 112 may be employed in the various arrangements as described above.

Various applications and/or other functionality may be executed in the computing device 112 according to various embodiments. Also, various data is stored in a data store 139 that is accessible to the computing device 112. The data store 139 may be representative of a plurality of data stores 139 as can be appreciated. The data stored in the data store 139, for example, is associated with the operation of the various applications and/or functional entities described below.

The components executed on the computing device 112, for example, include a payment processing server 142, a key management application 145, a decryption application 148, and other applications, services, processes, systems, engines, or functionality not discussed in detail herein. The payment processing server 142 is executed to obtain encrypted form data related to a payment instrument from the network page server 124. The payment processing server 142 decrypts the form data, stores the decrypted form data in the data store 139, and then initiates the processing of a payment according to the payment instruments. To this end, the payment processing server 142 may communicate portions of the form data to external payment processing servers through encrypted channels of communication. It is noted that the payment processing server 142 may correspond to any application that performs processing of confidential data according to the principles outlined herein.

The key management application 145 is executed to manage the various public/private key pairs employed in the networked environment for client-side encryption of form data. To this end, the key management application 145 is configured to generate sets of public/private key pairs and deploy the public keys to the network page server 124. The key management application 145 is also configured to replace sets of public keys and to delete retired sets of private keys periodically.

The decryption application 148 is executed by the payment processing server 142 to decrypt the encrypted form data with a corresponding private key. The decryption application 148 may employ various cryptographic algorithms such as, for example, public-key cryptography, symmetric-key cryptography, hashing, etc. The decryption application 148 may correspond to a commercially available application, library, or module such as, for example, GNU Privacy Guard (GnuPG), Pretty Good Privacy (PGP®), and so on.

The data stored in the data store 139 includes, for example, payment data 151, public keys 154, private keys 157, and potentially other data. The payment data 151 corresponds to the decrypted form data stored by the payment processing server 142 in the data store 139. In some embodiments, the payment data 151 may be stored in an encrypted state to comply, for example, with the Payment Card Industry Data Security Standard (PCI DSS) and/or other security standards. However, it is understood that the payment data 151 has been decrypted from the previously encrypted state in which it was received by the payment processing server 142. The public keys 154 and private keys 157 correspond to the key pairs that have been generated by the key management application 145. The payment data 151 and the private keys 157 are maintained by the data store 139 in a secured state such that applications outside of the firewall 118 cannot access the payment data 151 and the private keys 157.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 160. The display 160 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 163 and/or other applications. The browser 163 may be executed in a client 106, for example, to access and render network pages 128, such as web pages, or other network content served up by the computing device 103 and/or other servers, thereby generating a rendered network page 166 on the display 160. The browser 163 may be configured to download and execute the encryption code 169 provided by the network page server 124 along with a network page 128. However, it is understood that some configurations of the browser 163 may not support the execution of the encryption code 169. The client 106 may be configured to execute applications beyond the browser 163 such as, for example, email applications, instant message applications, and/or other applications.

Next, a general description of the operation of the various components of the networked environment 100 is provided. To begin, a user at a client 106 requests a network page 128 from the network page server 124 or another server. As a non-limiting example, the user may be placing an order for an item through a network site, making a utility payment, making a mortgage payment, and/or performing another action that involves the collection of confidential data. The network page 128 is generated using, for example, the network page data 130. A specific non-limiting example of the network page 128 will be discussed next.

Figure 2:
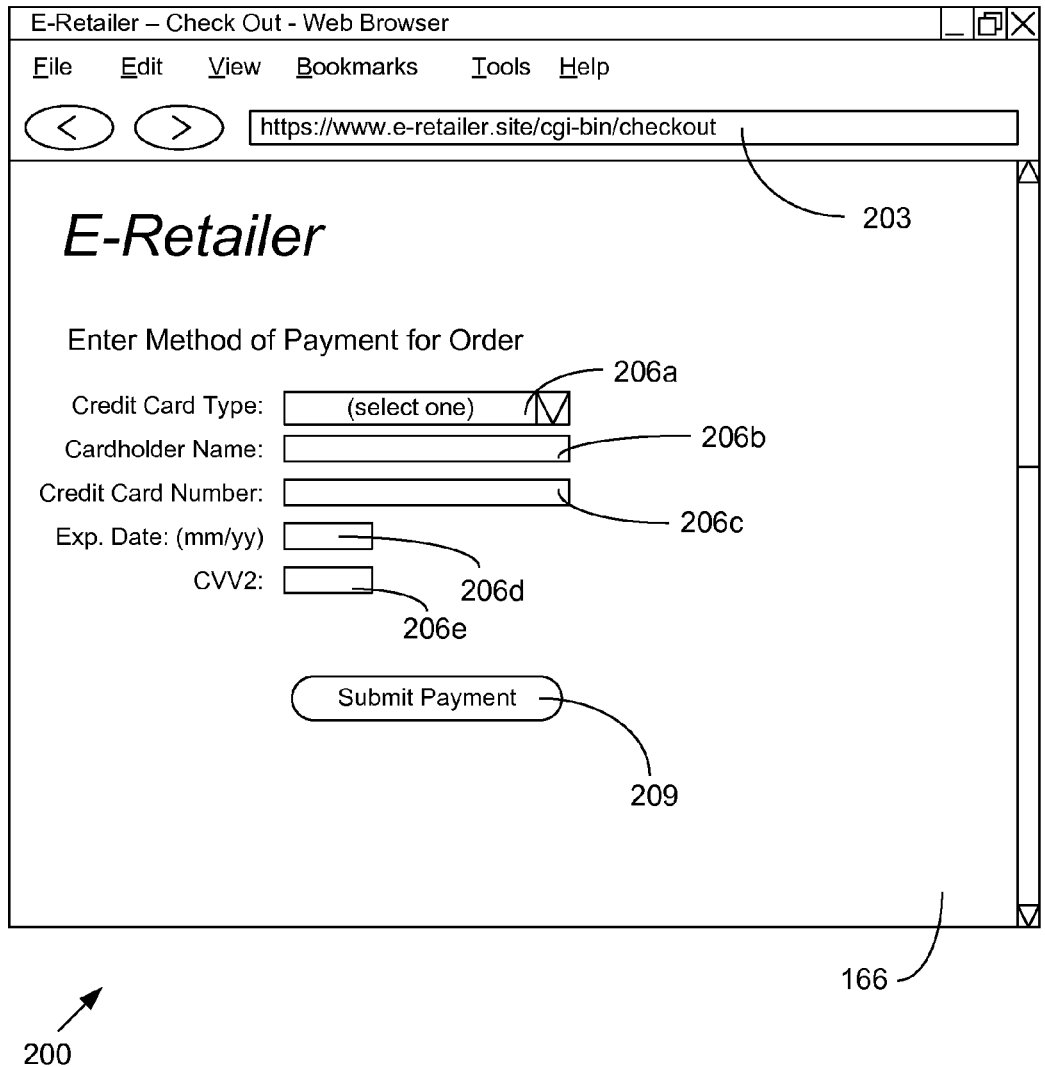
FIG. 2 is a drawing of an example of a user interface rendered by a client in the networked environment of FIG. 1 according to various embodiments of the present disclosure.

Referring now to FIG. 2, shown is one example of a user interface 200 rendered by a browser 163 (FIG. 1) executed in a client 106 (FIG. 1) in the networked environment 100 (FIG. 1). Specifically, FIG. 2 depicts an example of a rendered network page 166 that represents a rendering of a network page 128 (FIG. 1) obtained from the network page server 124 (FIG. 1) or another server. The rendered network page 166 in this example presents a form for collecting payment information from the user.

The address bar 203 of the user interface 200 indicates that the network page 128 was obtained over an encrypted HTTPS connection. Although the network page 128 was obtained over such an encrypted connection, it is understood that this is not a requirement. Indeed, a network page 128 may be served up over a non-encrypted HTTP connection and yet contain a form that obtains information securely.

The rendered network page 166 includes a plurality of form fields 206 that each elicits user input for a plurality of data items that are to be sent to the network page server 124. For example, form field 206a collects a selection of a credit card type, form field 206b collects a cardholder name, form field 206c collects a credit card number, form field 206d collects an expiration date, and form field 206e collects a card verification code. Other user interface components may be employed in other examples to obtain these and/or other data items. A submit component 209 may be provided for the user to submit the form to the network page server 124.

With reference now to both FIGS. 1 and 2, the general description of the operation of the various components of the networked environment 100 continues. The encryption code 133 may be downloaded from the network page server 124 in association with the network page 128 and executed in the browser 163 as the encryption code 169. The network page server 124 selects a public key from the active public keys 136 and provides it to the client 106 with the encryption code 133. After the user fills out the form fields 206, one or more of the form fields 206 may be encrypted in the client 106 by the encryption code 169. In one embodiment, execution of the encryption code 169 is triggered upon the selection of the submit component 209.

The encryption code 169 may or may not execute depending on whether the browser 163 supports the encryption code 169. Also, such support may be enabled or disabled in the browser 163. Thus, the form field(s) 206 that are to be encrypted by the encryption code 169 may or may not be encrypted. Upon submitting the form, the browser 163 sends the form data to the network page server 124 using, for example, HTTP "GET," HTTP "POST," HTTP "PUT," and/or other approaches to form submission. The form data may be sent over an encrypted channel, e.g., using SSL, TLS, or another encryption standard. If form data has been encrypted using the encryption code 169, such form data may be encrypted again by the encrypted channel.

In one embodiment, the form data that is encrypted by the encryption code 169 is provided with special names (e.g., "encrypted_credit_card_number") that differ from names given to unencrypted fields (e.g., "credit_card_number"). As a non-limiting example, when the form field 206c corresponding to the credit card number is encrypted by the encryption code 169, the encrypted result may be provided to the network page server 124 under the name "encrypted_credit_card_number," while the value associated with "credit_card_number" may be blank or a null string. Conversely, when the form field 206c is not encrypted, the value associated with "credit_card_number" may be the clear text credit card number.

Upon receipt of the form data from the client 106, the network page server 124 determines whether the form fields 206 that should have been encrypted by the encryption code 169 have in fact been encrypted. If the corresponding data items have not been encrypted, the network page server 124 utilizes the encryption application 127 to encrypt the data items using the appropriate public key from the active public keys 136. It is noted that one or more data items may be intentionally transmitted to the network page server 124 in an unencrypted form and perhaps through an encrypted channel. For example, the expiration date for a credit card might not be considered significant enough to warrant the additional layer of client-side encryption. Such data items may or may not be encrypted by the encryption application 127. Further, the network page server 124 may transmit such unencrypted data items to other systems on the network 115, such as order fulfillment systems, accounting systems, and/or other systems.

The network page server 124 then sends the form data items in an encrypted state over the network 115 and through the firewall 118 to the payment processing server 142. In some embodiments, the network page server 124 may send the encrypted data items to an intermediate server via the network 115, such as, for example, an application server and/or another server, which will then transmit the encrypted data items to the payment processing server 142. The form data items may be transmitted to the payment processing server 142 in the encrypted state within either an encrypted channel or an unencrypted channel. The payment processing server 142 then decrypts the form data items with the decryption application 148 using the corresponding private key 157 and stores the unencrypted form data items in the data store 139 as payment data 151. The payment processing server 142 may also initiate processing of a payment using the payment instrument identified in the form data.

Accordingly, when the encryption code 169 is supported by the browser 163, the confidential form data remains in an encrypted state as it passes through the network 109 and the network 115. Further, when the encryption code 169 is not supported by the browser 163, the network page server 124 may encrypt the confidential form data to prevent interception over the network 115. It is noted that change management approaches may be employed to ensure the integrity of the processes executing on the computing devices 103 and 112. In addition, the computing device 112 may be under heightened security scrutiny with access permitted only to a limited number of personnel. For example, accesses may be logged and regularly audited. Alerts may be generated and sent to system administrators based on improper or suspicious use. The systems described herein may be compliant with one or more industry standards for information security, for example, PCI DSS and/or other standards.

In some embodiments, various data items that are encrypted may be divided up into multiple messages by the encryption code 169 and/or the encryption application 127. Each of the messages may be encrypted separately and associated with a respective sequence number. The encrypted messages may be decrypted and reassembled by the payment processing server 142 and/or the decryption application 148.

Figure 3:
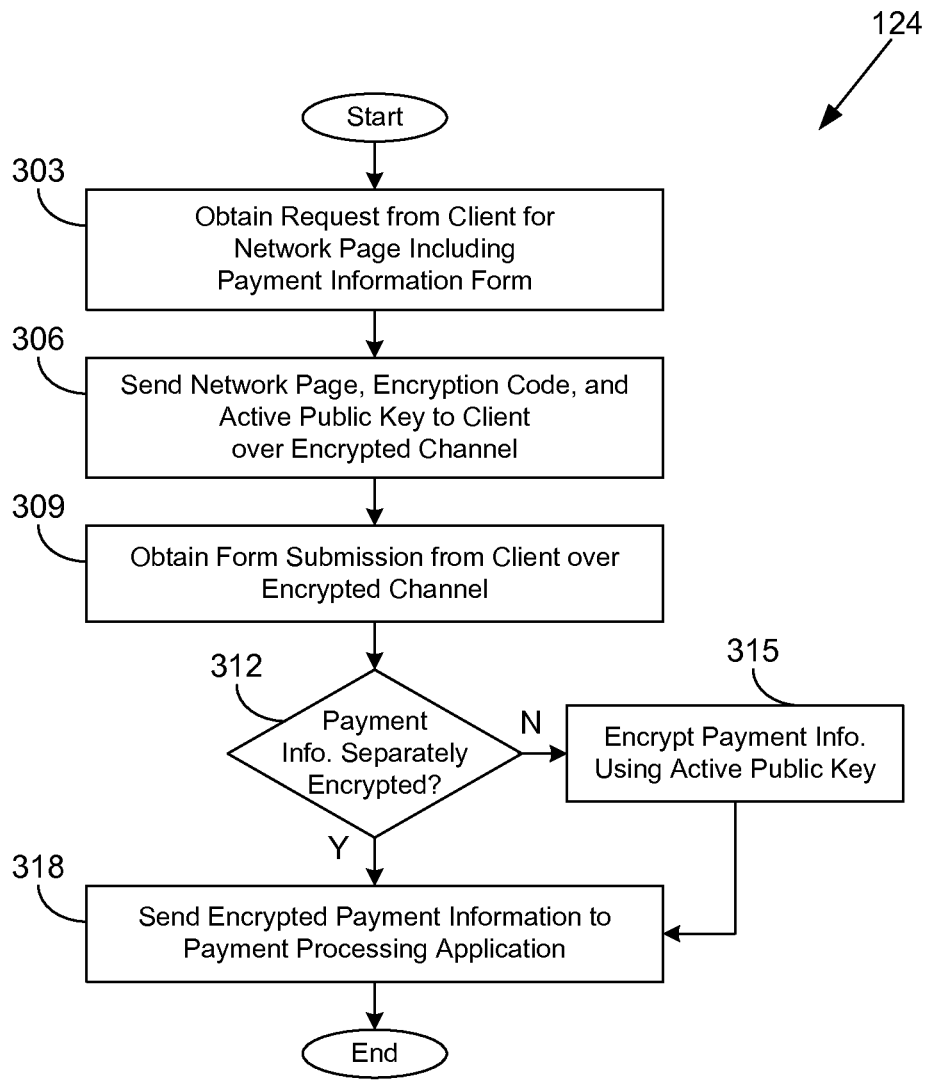
FIG. 3 is a flowchart illustrating one example of functionality implemented as portions of a network page server executed in a computing device in the networked environment of FIG. 1 according to various embodiments of the present disclosure.

Referring next to FIG. 3, shown is a flowchart that provides one example of the operation of a portion of the network page server 124 according to various embodiments. It is understood that the flowchart of FIG. 3 provides merely an example of the many different types of functional arrangements that may be employed to implement the operation of the portion of the network page server 124 as described herein. As an alternative, the flowchart of FIG. 3 may be viewed as depicting an example of steps of a method implemented in the computing device 103 (FIG. 1) according to one or more embodiments.

Beginning with box 303, the network page server 124 obtains a request from the client 106 (FIG. 1) for a network page 128 (FIG. 1) that includes a payment information form. In box 306, the network page server 124 sends the network page 128, the encryption code 133 (FIG. 1), and an active public key selected from the active public keys 136 (FIG. 1) to the client 106 over an encrypted channel. In box 309, the network page server 124 obtains the form submission from the client 106 over the encrypted channel.

In box 312, the network page server 124 determines whether the payment information has been separately encrypted from the encryption used in the encrypted channel. That is to say, the network page server 124 determines whether the encryption code 169 (FIG. 1) in the client 106 has encrypted the pertinent form fields. If the network page server 124 determines that the payment information has not been separately encrypted, then in box 315, the network page server 124 encrypts the payment information with the encryption application 127 (FIG. 1) using the active public key. Thereafter, the network page server 124 proceeds to box 318. If the payment information is already separately encrypted, the network page server 124 also proceeds to box 318.

In box 318, the network page server 124 sends the encrypted payment information to the payment processing server 142 (FIG. 1) over the network 115 (FIG. 1) and through the firewall 118 (FIG. 1). The encrypted payment information may or may not be sent via an encrypted channel. Thereafter, the portion of the network page server 124 ends.

Figure 4:
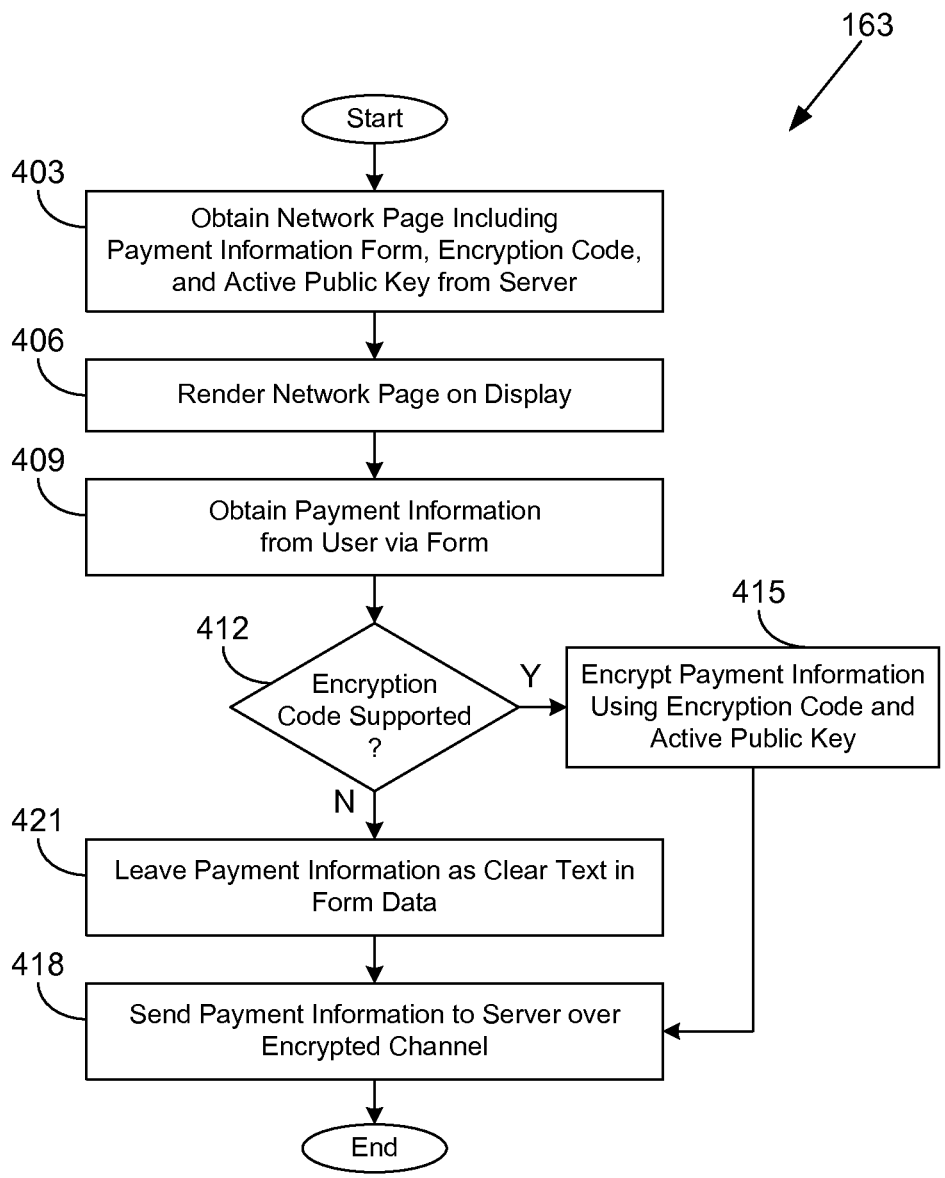
FIG. 4 is a flowchart illustrating one example of functionality implemented as portions of a browser executed in a client in the networked environment of FIG. 1 according to various embodiments of the present disclosure.

Moving on to FIG. 4, shown is a flowchart that provides one example of the operation of a portion of the browser 163 according to various embodiments. It is understood that the flowchart of FIG. 4 provides merely an example of the many different types of functional arrangements that may be employed to implement the operation of the portion of the browser 163 as described herein. As an alternative, the flowchart of FIG. 4 may be viewed as depicting an example of steps of a method implemented in the client 106 (FIG. 1) according to one or more embodiments.

Beginning with box 403, the browser 163 obtains a network page 128 (FIG. 1) from the network page server 124 (FIG. 1). The network page 128 includes a payment information form, encryption code 133 (FIG. 1), and a public key selected from the active public keys 136 (FIG. 1). In box 406, the browser 163 renders the network page 128 on the display 160 (FIG. 1) as a rendered network page 166 (FIG. 1). In box 409, the browser 163 obtains the payment information from the user via the form fields 206 (FIG. 2).

In box 412, the browser 163 determines whether the encryption code 133 is supported. For instance, the encryption code 133 may be in a scripting language that may or may not be enabled in the browser 163. In some cases, the encryption code 133 may not be downloaded from the network page server 124 when the encryption code 133 is not supported. If the encryption code 133 is supported, it is downloaded from the network page server 124 and executed in the browser 163 as the encryption code 169 (FIG. 1).

If the encryption code 133 is supported, then in box 415, the browser 163 encrypts the payment information using the encryption code 169 and the public key. The browser 163 then proceeds to box 418 and sends the payment information to the network page server 124 over an encrypted channel. Thereafter, the portion of the browser 163 ends.

If the encryption code 133 is unsupported, the browser 163 instead moves to box 421 and leaves the payment information as unencrypted clear text in the form data. The browser 163 then proceeds to box 418 and sends the payment information to the network page server 124 over an encrypted channel. Thereafter, the portion of the browser 163 ends.

Figure 5:
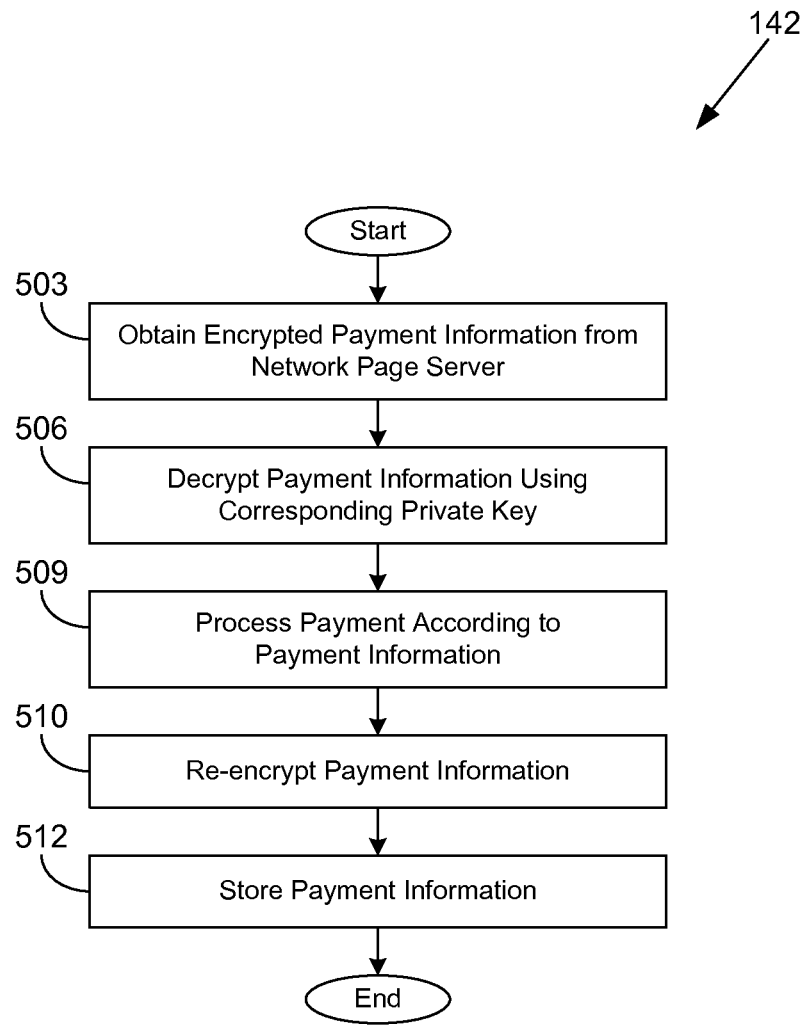
FIG. 5 is a flowchart illustrating one example of functionality implemented as portions of a payment processing server executed in a computing device in the networked environment of FIG. 1 according to various embodiments of the present disclosure.

With reference to FIG. 5, shown is a flowchart that provides one example of the operation of a portion of the payment processing server 142 according to various embodiments. It is understood that the flowchart of FIG. 5 provides merely an example of the many different types of functional arrangements that may be employed to implement the operation of the portion of the payment processing server 142 as described herein. As an alternative, the flowchart of FIG. 5 may be viewed as depicting an example of steps of a method implemented in the computing device 112 (FIG. 1) according to one or more embodiments.

Beginning with box 503, the payment processing server 142 obtains encrypted payment information from the network page server 124 (FIG. 1) over the network 115 (FIG. 1) and through the firewall 118 (FIG. 1). In some embodiments, the encrypted payment information may be obtained through an encrypted channel in addition to the payment information being separately encrypted either in the client 106 (FIG. 1) or the computing device 103 (FIG. 1). In box 506, the payment processing server 142 decrypts the payment information using the corresponding private key 154 (FIG. 1).

In box 509, the payment processing server 142 initiates processing of a payment according to the payment information. In box 510, the payment processing server 142 re-encrypts the payment information for long-term storage using a different public key 154 (FIG. 1). In one embodiment, the payment information may be re-encrypted on a different computing device 112 from the computing device 112 in which the payment information is decrypted and processed. Also, the payment information may be re-encrypted using a public key 154 that is separate from the public keys 154 employed for client-side encryption. In box 512, the payment processing server 142 stores the payment information in an encrypted form as payment data 151 (FIG. 1) in the data store 139 (FIG. 1). Thereafter, the portion of the payment processing server 142 ends.

Figure 6:
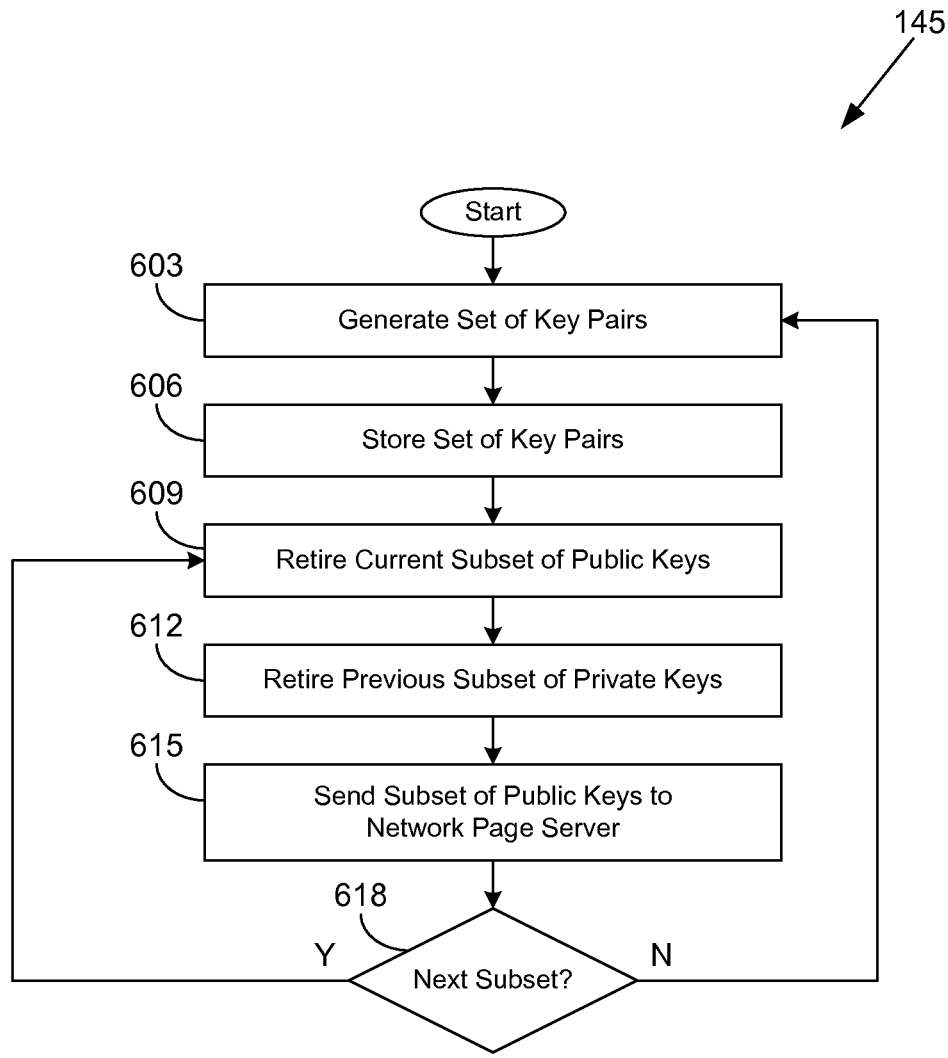
FIG. 6 is a flowchart illustrating one example of functionality implemented as portions of a key management application executed in a computing device in the networked environment of FIG. 1 according to various embodiments of the present disclosure.

Continuing on to FIG. 6, shown is a flowchart that provides one example of the operation of a portion of the key management application 145 according to various embodiments. It is understood that the flowchart of FIG. 6 provides merely an example of the many different types of functional arrangements that may be employed to implement the operation of the portion of the key management application 145 as described herein. As an alternative, the flowchart of FIG. 6 may be viewed as depicting an example of steps of a method implemented in the computing device 112 (FIG. 1) according to one or more embodiments.

Beginning with box 603, the key management application 145 generates a set of key pairs, which correspond to the public keys 154 (FIG. 1) and the private keys 157 (FIG. 1). In box 606, the key pairs are stored in the data store 139 (FIG. 1). In box 609, the key management application 145 retires a current subset of the public keys 154 that are being used by the encryption application 127 (FIG. 1) and the encryption code 169 (FIG. 1) as the active public keys 136 (FIG. 1). The subset of the public keys 154 are retired after a relatively short time frame, e.g., five days, a week, etc., rather than a relatively long time frame, e.g., six months, a year, etc. A relatively short time frame is employed to reduce the security risks associated with intercepted, cracked, or otherwise stolen private keys 157. In some embodiments, the retired public keys 154 may be deleted from the data store 139 and the active public keys 136 may be deleted from the data store 121 (FIG. 1). In some embodiments, the retired public keys 154 may be set to expire or obsolesce automatically.

In box 612, the key management application 145 retires the previous subset of private keys 157 that were used previously with the public keys 154 that were retired in box 609. In some embodiments, the retired private keys 157 may be deleted from the data store 139. In some embodiments, the retired private keys 157 may be set to expire or obsolesce automatically. In box 615, the key management application 145 sends a subset of public keys 154 to the network page server 124 (FIG. 1) for use as the active public keys 136.

In response to the expiration of a predefined time period, or otherwise on a periodic basis, the key management application 145 continues to box 618. In box 618, the key management application 145 determines whether the set of key pairs generated in box 603 includes another subset of key pairs that have yet to be used. If the set of key pairs does include another subset of key pairs, the key management application 145 returns to box 609, continues to box 612, and deploys the next subset of key pairs in box 615. If the set of key pairs does not include another subset of key pairs, the key management application 145 returns to box 603 and generates another set of key pairs.

Figure 7:
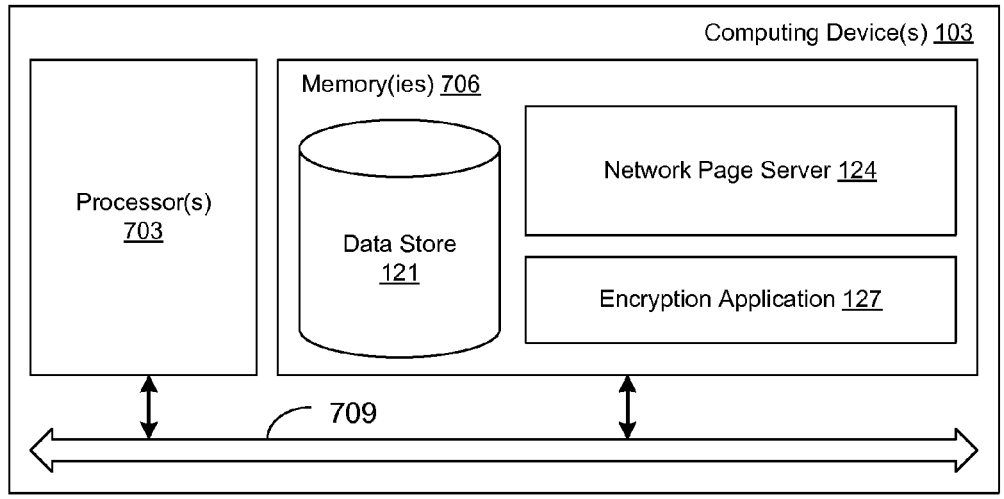
FIGS. 7 and 8 are schematic block diagrams that provide example illustrations of computing devices employed in the networked environment of FIG. 1 according to various embodiments of the present disclosure.

With reference to FIG. 7, shown is a schematic block diagram of the computing device 103 according to an embodiment of the present disclosure. The computing device 103 includes at least one processor circuit, for example, having a processor 703 and a memory 706, both of which are coupled to a local interface 709. To this end, the computing device 103 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the network page server 124, the encryption application 127, and potentially other applications. Also stored in the memory 706 may be a data store 121 and other data. In addition, an operating system may be stored in the memory 706 and executable by the processor 703.

Figure 8:
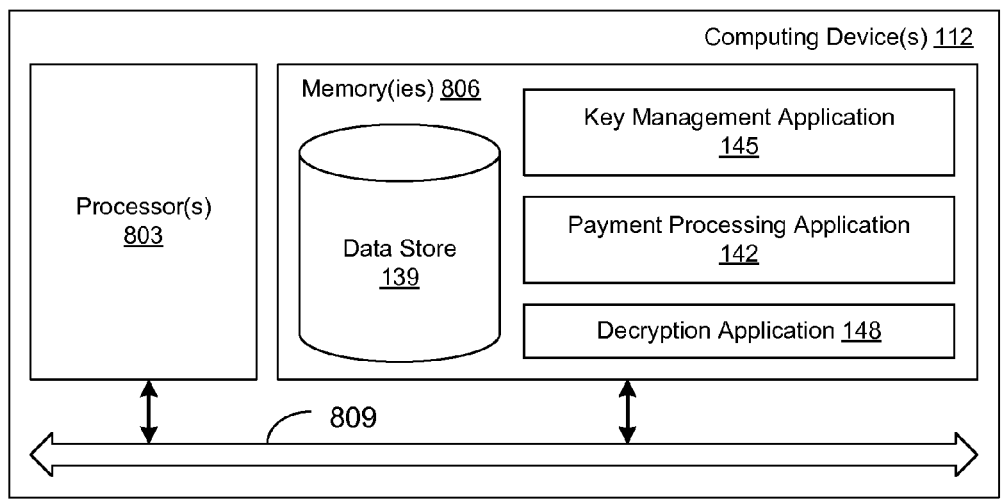

With reference to FIG. 8, shown is a schematic block diagram of the computing device 112 according to an embodiment of the present disclosure. The computing device 112 includes at least one processor circuit, for example, having a processor 803 and a memory 806, both of which are coupled to a local interface 809. To this end, the computing device 112 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the payment processing server 142, the key management application 145, the decryption application 148, and potentially other applications. Also stored in the memory 806 may be a data store 139 and other data. In addition, an operating system may be stored in the memory 806 and executable by the processor 803.

Referring now to both FIGS. 7 and 8, it is understood that there may be other applications that are stored in the memory 706, 806 and are executable by the processors 703, 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 706, 806 and are executable by the processor 703, 803. In this respect, the term "executable" means a program file that is in a form that can ultimately be run by the processor 703, 803. Examples of executable programs may be, for example, a compiled program that can be translated into machine code in a format that can be loaded into a random access portion of the memory 706, 806 and run by the processor 703, 803, source code that may be expressed in proper format such as object code that is capable of being loaded into a random access portion of the memory 706, 806 and executed by the processor 703, 803, or source code that may be interpreted by another executable program to generate instructions in a random access portion of the memory 706, 806 to be executed by the processor 703, 803, etc. An executable program may be stored in any portion or component of the memory 706, 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706, 806 is defined herein as including both volatile and nonvolatile memory and data storage components. Volatile components are those that do not retain data values upon loss of power. Nonvolatile components are those that retain data upon a loss of power. Thus, the memory 706, 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703, 803 may represent multiple processors 703, 803 and the memory 706, 806 may represent multiple memories 706, 806 that operate in parallel processing circuits, respectively. In such a case, the local interface 709, 809 may be an appropriate network 115 (FIG. 1) that facilitates communication between any two of the multiple processors 703, 803, between any processor 703, 803 and any of the memories 706, 806, or between any two of the memories 706, 806, etc. The local interface 709, 809 may comprise additional systems designed to coordinate this communication, including, for example, performing load balancing. The processor 703, 803 may be of electrical or of some other available construction.

Although the network page server 124, the encryption application 127, the payment processing server 142, the key management application 145, the decryption application 148, the browser 163 (FIG. 1), the encryption code 169 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3-6 show the functionality and operation of an implementation of portions of the network page server 124, the browser 163, the payment processing server 142, and the key management application 145. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703, 803 in a computer system or other system. The machine code may be converted from the source code, etc. If embodied in hardware, each block may represent a circuit or a number of interconnected circuits to implement the specified logical function(s).

Although the flowcharts of FIGS. 3-6 show a specific order of execution, it is understood that the order of execution may differ from that which is depicted. For example, the order of execution of two or more blocks may be scrambled relative to the order shown. Also, two or more blocks shown in succession in FIGS. 3-6 may be executed concurrently or with partial concurrence. Further, in some embodiments, one or more of the blocks shown in FIGS. 3-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network page server 124, the encryption application 127, the payment processing server 142, the key management application 145, the decryption application 148, the browser 163, and the encryption code 169, that comprises software or code can be embodied in any non-transitory computer-readable medium for use by or in connection with an instruction execution system such as, for example, a processor 703, 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are Therefore, the following is claimed:

1. A system, comprising:
   at least one computing device; and
   a network page server executable in the at least one computing device, the network page server comprising:
   logic that sends a network page to a client, the network page including code that encrypts at least one data item in the client using a public key, the at least one data item being provided by a user in at least one form field of the network page and including private data;
   logic that, in response to receiving the at least one data item and at least one unencrypted data item from the client over an encrypted channel, determines whether the at least one data item that has been received has been encrypted in the client by the code that encrypts, wherein the logic that determines whether the at least one data item that has been received has been encrypted in the client by the code that encrypts is configured to at least:
   determine a first form parameter name corresponding to the at least one data item being encrypted in the client and a second form parameter name corresponding to the at least one data item not being encrypted in the client; and
   determine whether form data received from the client includes the at least one data item under the first form parameter name or the second form parameter name;
   logic that encrypts the at least one data item using the public key in response to determining that the at least one data item that has been received has not been encrypted in the client by the code that encrypts, wherein the logic that encrypts is configured not to encrypt the at least one data item in response to determining that the at least one data item that has been received has been encrypted in the client by the code that encrypts; and
   logic that sends the at least one data item in an encrypted state to a server over an internal network, wherein a firewall is interposed between the internal network and the server to protect the server from the internal network.

2. The system of claim 1, wherein the encrypted channel employs transport layer security (TLS).

3. The system of claim 1, wherein the encrypted channel employs hypertext transfer protocol secure (HTTPS).

4. The system of claim 1, wherein the code that encrypts comprises JavaScript code.

5. The system of claim 1, wherein the at least one data item is received from the client in an unencrypted state responsive to the code that encrypts not being supported by the client.

6. The system of claim 1, wherein the network page server further comprises logic that selects the public key from a plurality of active public keys.

7. The system of claim 6, wherein the network page server further comprises logic that periodically replaces the active public keys with another plurality of active public keys.

8. The system of claim 1, wherein the server is configured to decrypt the at least one data item using a private key that corresponds to the public key.

9. The system of claim 8, wherein the server is further configured to delete the private key from a data store after an expiration of a predefined time period.

10. The system of claim 8, wherein the private key is available only behind the firewall.

11. The system of claim 8, wherein the logic that sends the at least one data item in the encrypted state to the server is further configured to send the at least one data item in the encrypted state to the server through an encrypted channel.

12. A method, comprising:
    sending, via at least one of one or more computing devices, a network page to a client, the network page including code that encrypts at least one data item in the client using a public key, the at least one data item being provided by a user in at least one form field of the network page and including private data;
    receiving, via at least one of the one or more computing devices, the at least one data item and at least one unencrypted data item from the client over an encrypted channel;
    determining, via at least one of the one or more computing devices, whether the at least one data item that has been received has been encrypted in the client by the code that encrypts, wherein determining whether the at least one data item that has been received has been encrypted in the client by the code that encrypts further comprises:
    determining, via at least one of the one or more computing devices, a first form parameter name corresponding to the at least one data item being encrypted in the client and a second form parameter name corresponding to the at least one data item not being encrypted in the client; and
    determining, via at least one of the one or more computing devices, whether form data received from the client includes the at least one data item under the first form parameter name or the second form parameter name;
    encrypting, via at least one of the one or more computing devices, the at least one data item using the public key in response to determining that the at least one data item that has been received has not been encrypted in the client by the code that encrypts, wherein the encrypting is skipped for the at least one data item in response to determining that the at least one data item that has been received has been encrypted in the client by the code that encrypts; and
    sending, via at least one of the one or more computing devices, the at least one data item in an encrypted state to a server over an internal network, wherein a firewall is interposed between the internal network and the server to protect the server from the internal network.

13. The method of claim 12, wherein the at least one data item is received from the client in an unencrypted state responsive to the code that encrypts not being supported by the client.

14. The method of claim 12, further comprising selecting, via at least one of the one or more computing devices, the public key from a plurality of active public keys.

15. The method of claim 14, further comprising periodically replacing, via at least one of the one or more computing devices, the active public keys with another plurality of active public keys.

16. The method of claim 12, wherein the server is configured to decrypt the at least one data item using a private key that corresponds to the public key.

17. The method of claim 16, wherein the server is further configured to delete the private key from a data store after an expiration of a predefined time period.

18. A non-transitory computer-readable medium embodying a program executable in at least one computing device, comprising:

code that sends a network page to a client, the network page including client-executable code that encrypts at least one data item in the client using a public key, the at least one data item being provided by a user in at least one form field of the network page and including private data;

code that, in response to receiving the at least one data item and at least one unencrypted data item from the client over an encrypted channel, determines whether the at least one data item that has been received has been encrypted in the client by the client-executable code that encrypts, wherein the code that determines whether the at least one data item that has been received has been encrypted in the client by the client-executable code that encrypts is configured to at least:

determine a first form parameter name corresponding to the at least one data item being encrypted in the client and a second form parameter name corresponding to the at least one data item not being encrypted in the client; and determine whether form data received from the client includes the at least one data item under the first form parameter name or the second form parameter name;

code that encrypts the at least one data item using the public key in response to determining that the at least one data item that has been received has not been encrypted in the client by the code that encrypts, wherein the code that encrypts is configured not to encrypt the at least one data item in response to determining that the at least one data item that has been received has been encrypted in the client by the client-executable code that encrypts; and code that sends the at least one data item in an encrypted state to a server over an internal network, wherein a firewall is interposed between the internal network and the server to protect the server from the internal network.

19. The non-transitory computer-readable medium of claim 18, wherein the at least one data item is received from the client in an unencrypted state responsive to the client-executable code that encrypts not being supported by the client.

20. The non-transitory computer-readable medium of claim 18, further comprising code that selects the public key from a plurality of active public keys.

* * * * *